United States Patent
Yang

(10) Patent No.: US 9,862,064 B2
(45) Date of Patent: Jan. 9, 2018

(54) CLAMPING APPARATUS AND SCREW LOCKING DEVICE USING SAME

(71) Applicant: ScienBiziP Consulting (Shenzhen) Co., Ltd., Shenzhen (CN)

(72) Inventor: Guang Yang, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 398 days.

(21) Appl. No.: 14/693,283

(22) Filed: Apr. 22, 2015

(65) Prior Publication Data

US 2016/0059422 A1 Mar. 3, 2016

(30) Foreign Application Priority Data

Sep. 1, 2014 (CN) .......................... 2014 1 0439508

(51) Int. Cl.
*B23P 19/06* (2006.01)

(52) U.S. Cl.
CPC .................................. *B23P 19/06* (2013.01)

(58) Field of Classification Search
CPC .... B25B 1/00; B25B 3/00; B25B 5/00; B25B 7/00; B66F 9/075554; B66D 1/00; B66D 3/00; B66D 2700/00
See application file for complete search history.

(56) References Cited

U.S. PATENT DOCUMENTS

| 3,801,069 | A | * | 4/1974 | McCarstle | B66C 23/00 254/326 |
| 4,049,238 | A | * | 9/1977 | Brown | B66C 23/42 212/264 |
| 4,341,373 | A | * | 7/1982 | Mouton, Jr. | B66D 3/04 254/29 R |
| 5,967,732 | A | * | 10/1999 | Floyd | B66F 3/00 254/4 R |
| 2016/0059422 | A1 | * | 3/2016 | Yang | B23P 19/06 81/57.4 |

\* cited by examiner

*Primary Examiner* — Lee D Wilson
(74) *Attorney, Agent, or Firm* — ScienBiziP, P.C.

(57) ABSTRACT

A clamping device includes a supporting bracket, a lifting assembly, a first adjusting assembly and a holding assembly. The supporting bracket includes a supporting member. The lifting assembly includes a first lifting member, a second lifting member, a fixed pulley, a connecting member and a clump weight. The first lifting member and the second lifting member are both slidably sleeved on the supporting member. The fixed pulley is mounted on the supporting member. The connecting member is arranged on the fixed pulley and couples the first lifting member to the second lifting member. The clump weight is detachably fixed to the first lifting member. The first adjusting assembly includes a first fixed member rotatably sleeved on the second lifting member and a first adjusting member rotatably sleeved to the first fixed member. The holding assembly is rotationally mounted on the first adjusting member.

18 Claims, 3 Drawing Sheets

CLAMPING APPARATUS AND SCREW LOCKING DEVICE USING SAME

FIELD

The subject matter herein generally relates to clamping apparatuses, and especially to a clamping apparatus for clamping an electric screw driver and a screw locking device using same.

BACKGROUND

When the product is assembled or disassembled, an electric screwdriver is usually required to tighten or loosen the screws. To hold the electric screwdriver, the general method is holding the electric screwdriver by using a ring. However, when the need to assemble or disassemble the screws, the operator needs to overcome the elastic force generated by the ring, which causes inconvenience.

BRIEF DESCRIPTION OF THE DRAWINGS

Many aspects of the present disclosure are better understood with reference to the follow drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
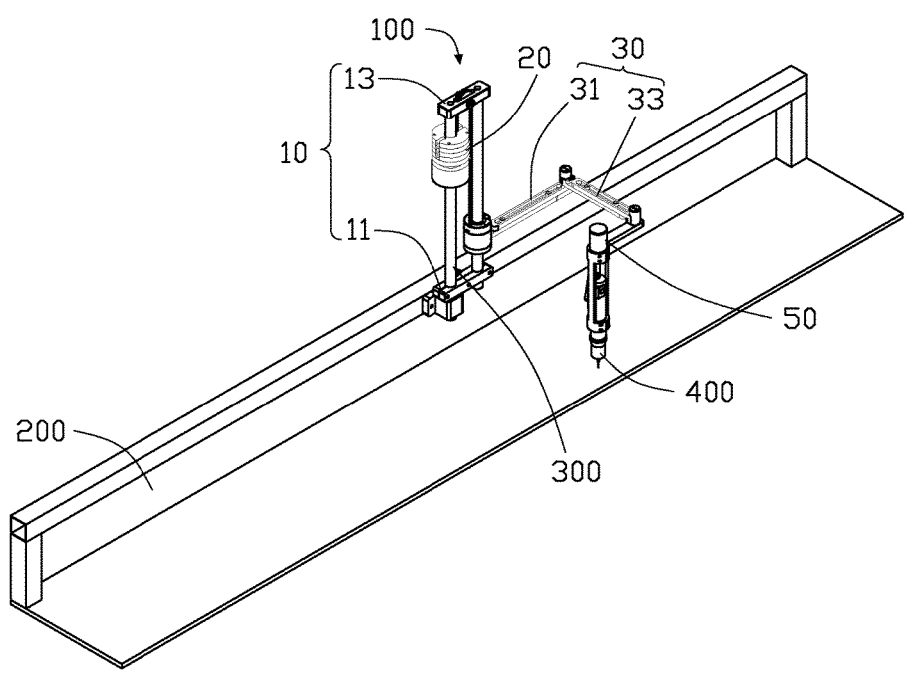
FIG. 1 is an isometric view of an embodiment of an environment of a screw locking device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected.

The term "comprising" when utilized, means "including, but not necessarily limited to"; it specifically indicates open-ended inclusion or membership in the so-described combination, group, series and the like.

FIG. 1 shows an operating environment of a screw locking device 100. The screw locking device 100 can be used to tighten or loosen the screws, and the screw locking device 100 can be fixed to the worktable 200. The screw locking device 100 can include a clamping apparatus 300 and an electric screwdriver 400 fixed to the clamping apparatus 300. The clamping apparatus 300 can be fixed to the worktable 200, and further used to clamp the electric screwdriver 400.

The clamping apparatus 300 can include a supporting bracket 10, a lifting assembly 20 mounted on the supporting bracket 10, an adjusting mechanism 30 rotatably mounted on the lifting assembly 20, and a holding assembly 50 mounted on the adjusting mechanism 30.

Figure 2:
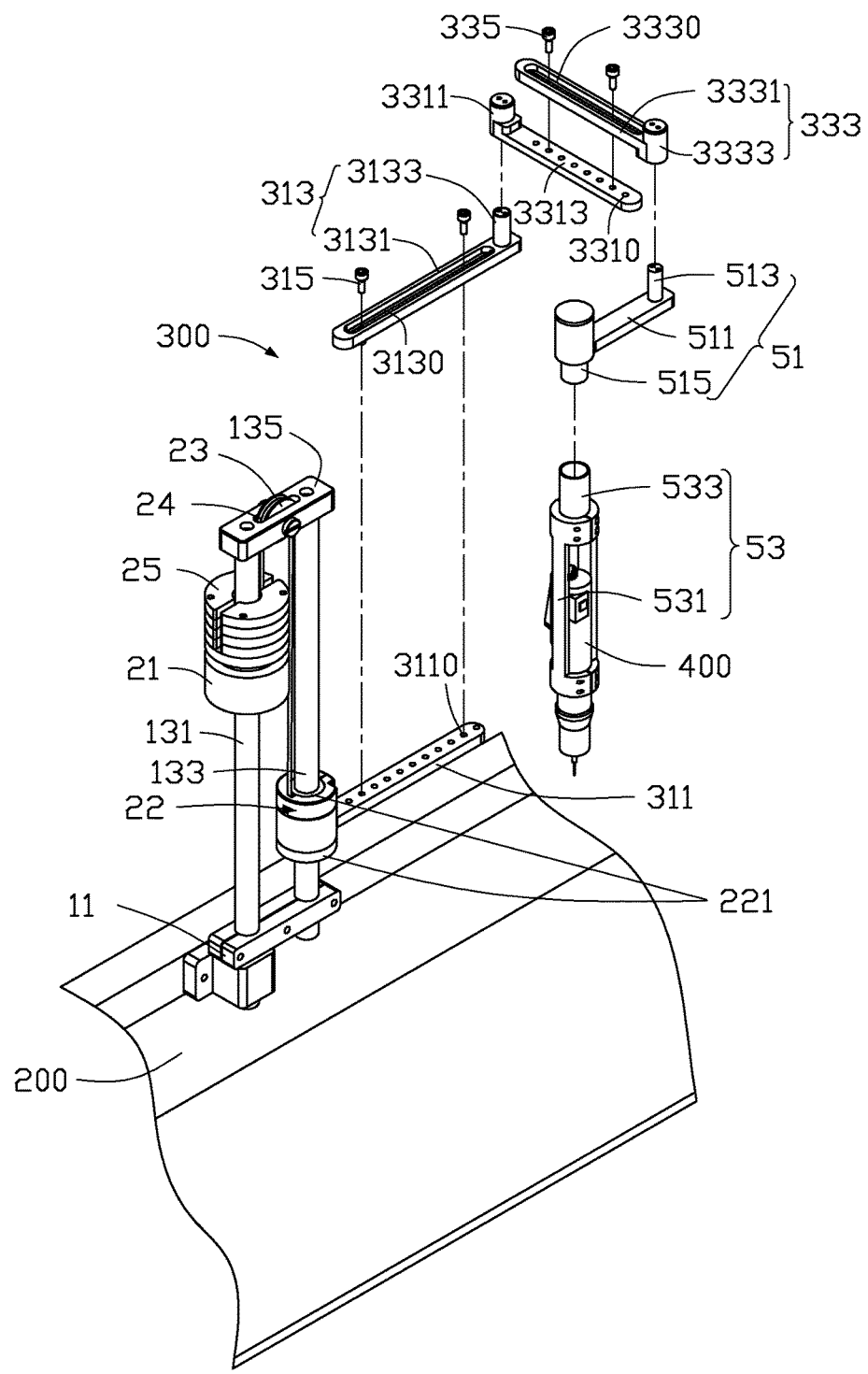
FIG. 2 is an exploded isometric view of an embodiment of the screw locking device shown in FIG. 1.
Figure 3:
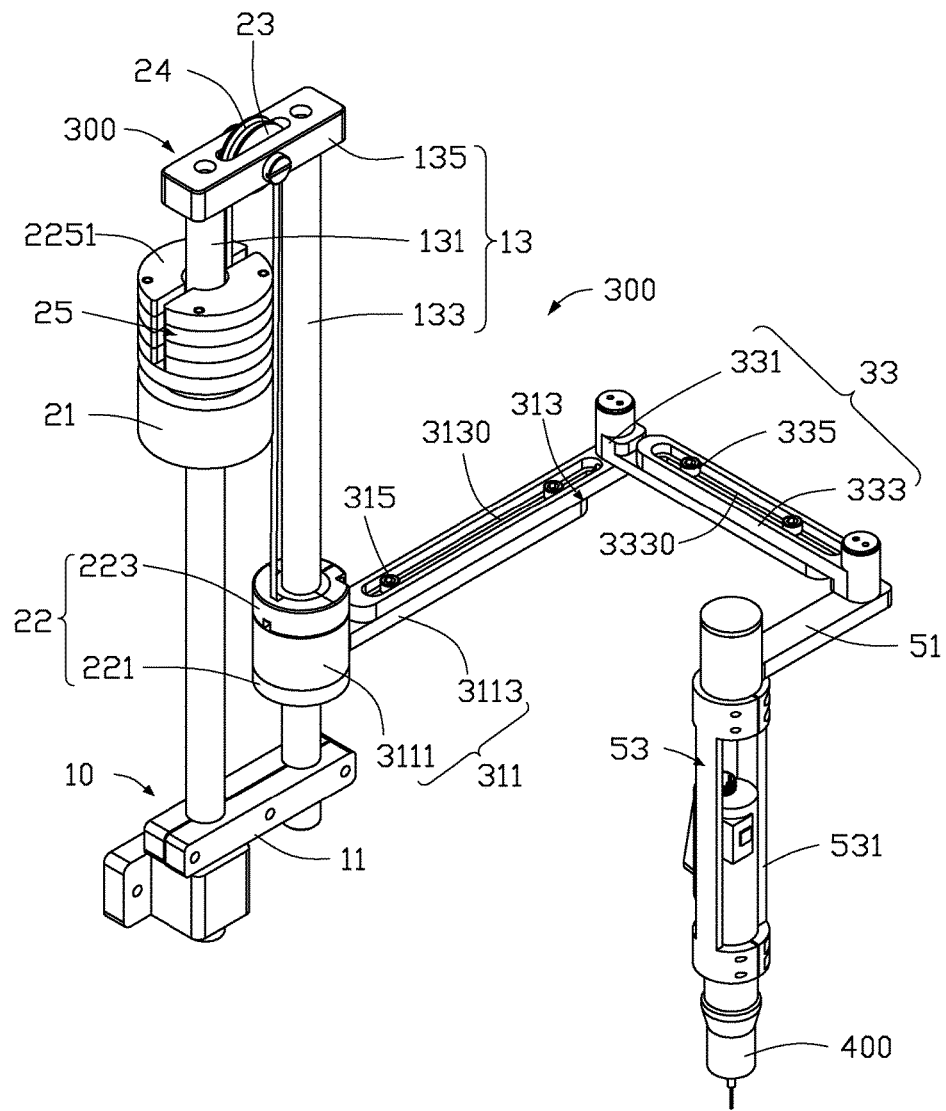
FIG. 3 is an isometric view of an embodiment of the screw locking device shown in FIG. 1.

The supporting bracket 10 can include a mounting member 11 and a supporting member 13 fixed on the mounting member 11. When in use, the mounting member 11 can be fixed to the worktable 200. The supporting member 13 can be U-shaped. Referring to FIGS. 2 and 3, the supporting member 13 can include a first supporting portion 131, a second supporting portion 133 and a mounting portion 135. The first supporting portion 131 and the second supporting portion 133 can be at least one of cylinder-shaped and rod-shaped. One end of the first supporting portion 131 and one end of the second supporting portion 133 can be both fixed to the mounting member 11 and further perpendicular to the mounting member 11. The first supporting portion 131 and the second supporting portion 133 can be parallel to each other and further extend along a vertical direction. The two ends of the mounting portion 135 can be fixed to one end of the first supporting portion 131 away from the mounting member 11 and one end of the second supporting portion 133 away from the mounting member 11 respectively. In this embodiment, the mounting portion 135 and the mounting member 11 can be parallel with each other. The mounting member 11, the first supporting portion 131, the second supporting portion 122 and the mounting portion 135 can cooperatively form a rectangular frame.

The lifting assembly 20 can be mounted on the supporting member 13. The lifting assembly 20 can include a first lifting member 21, a second lifting member 22, a fixed pulley 23, a connecting member 24 and a clump weight 25. In this embodiment, the connecting member 24 can be wire rope. The first lifting member 21 can be hollow-shaped and cylinder-shaped. The first lifting member 21 can be slidably sleeved on the first supporting portion 131. The second lifting member 22 can be slidably sleeved on the second supporting portion 133. The second lifting member 22 can include a sleeve portion 221 and a resisting portion 223. The sleeve portion 221 can be T-shaped. The sleeve portion 221 can be slidably sleeved on the second supporting portion 133. The resisting portion 223 can be hollow-shaped and disc-shaped. The resisting portion 223 can be sleeved on one end of the sleeve portion 221 close to the mounting portion 135, and further fixed to the sleeve portion 221. The fixed pulley 23 can be rotatably mounted on the mounting portion 135. The connecting member 24 can be arranged on the fixed pulley 23. One end of the connecting member 24 close to the first supporting portion 131 can extend to the first lifting member 21 and further fixed to the first lifting member 21, and the other end of the connecting member 24 close to the second supporting portion 133 can extend to the second lifting member 22, and further fixed to the resisting portion 223. The clump weight 25 can be detachably arranged on the first supporting portion 131 and further located on the first lifting member 21. The weight of the clump weight 25 can be selected according to the weight of the electric screwdriver 400, so as to ensure the weight of the clump weight 25 is larger than the weight of the electric screwdriver 400, and when the electric screwdriver 400 is released by the operator, the electric screwdriver 400 can move away from the worktable 200. In this embodiment, the clump weight 25 can include one or more weights 251, the weight of the clump weight 25 can be adjusted by adding, detracting or replacing the different weights 251. In this embodiment, the difference between the weight of clump weight 25 and the weight of the electric screwdriver 400 can be 50 g. In at least one embodiment, the difference can be but not limited to 50 g.

Referring to FIGS. 1, 2 and 3, the adjusting mechanism 30 can include a first adjusting assembly 31 and a second adjusting assembly 32 rotatably mounted on the first adjusting assembly 31. The first adjusting assembly 31 can include a first fixed member 311, a first adjusting member 313 slidably mounted on the first fixed member 311, and two first fasters 315 coupling the first fixed member 311 to the first adjusting member 313. The first fixed member 311 can be rotatably sleeved on the sleeve portion 221 perpendicularly. The first fixed member 311 can include a first main body 3111 and a first fixed portion 3113 fixed to the first main body 3111. The first main body 3111 can be hollow-shaped and cylinder-shaped. The first main body 3111 can be rotatably sleeved on the sleeve portion 221, and the two ends of the first main body 3111 can resist the sleeve portion 221 and the resisting portion 223 respectively. The first fixed portion 3113 can be rectangular-shaped. The first fixed portion 3113 can be protruded from the first main body 3111 along the radial direction of the first main body 3111. The first main body 3111 can define a number of first adjust holes 3110. In this embodiment, the number of the first adjust hole 3110 can be two or more.

The first adjusting member 313 can be slidably mounted on the first fixed portion 3113 of the first fixed member 311, and further parallel to the first fixed member 311. The first adjusting member 313 can include a first adjusting portion 3131 and a first protruding portion 3133. The first adjusting portion 3131 can define a first slide groove 3130. The two first fasters 315 can partially pass through the first slide groove 3130, and further engage with the first adjust holes 3110 respectively, and partially resist the first adjusting portion 3131. The first adjusting portion 3131 can slide relative to the first fixed portion 3113. In this embodiment, the sliding distance of the first adjusting portion 3131 relative to the first main body 3111 can be adjusted by adjusting the position of the first fastener 315 on the first main body 3111, and the first fasters 315 can be screw. The first protruding portion 3133 can be protruded from one end of the first adjusting portion 3131 away from the first main body 3111.

In at least one embodiment, the number of the first fasters 315 can be but not limited two, and further greater than one.

The second adjusting assembly 33 can be similar to the first adjusting assembly 31. The second adjusting assembly 33 can be rotatably mounted on the first protruding portion 3133, and the rotating axis of the second adjusting assembly 33 can be in a vertical direction. The second adjusting assembly 33 can include a second fixed member 331, a second adjusting member 333 slidably mounted on the second fixed member 331, and two second fasters 335 coupling the second fixed member 331 to the second adjusting member 333. The second fixed member 331 can be rotatably mounted on the first protruding portion 3133. The second fixed member 331 can include a second main body 3311 and a second fixed portion 3313 fixed to the second main body 3311 and further perpendicular to the second main body 3311. The second main body 3311 can be rotatably sleeved on the first protrusion 3133, and the rotating axis of the second main body 3311 can be in a vertical direction. The second fixed portion 3313 can be substantially rectangular-shaped. The second fixed portion 3313 can further define a number of second adjust holes 3310. In this embodiment, the number of the second adjust hole 3310 can be but not limited two, and further greater than two.

The second adjusting member 333 can be slidably mounted on the second fixed portion 3313 of the second fixed member 332, and the second adjusting member 332 can be parallel to the first fixed portion 311. The second adjusting member 333 can include a second adjusting portion 3331 and a second protruding portion 3333. The second adjusting portion 3311 can define a second slide groove 3330. The two second faster 335 can partially pass through the second slide groove 3330 and further fixed to the second adjust hole 3310 of the second fixed portion 3313, and partially resist the second adjusting portion 3331. The second adjusting portion 3331 can slide relative to the second fixed portion 3313. In this embodiment, the sliding distance of the second adjusting portion 3331 relative to the second main body 3311 can be adjusted by adjusting the position of the second fasters 335 on the second main body 3311, and the second fasters 335 can be screw. The second protruding portion 3333 can be protruded from one end of the second adjusting portion 3331 away from the second main body 3311. In at least one embodiment, the number of the second fasters 335 can be but not limited two and further greater than one.

The holding assembly 50 can include a rotating member 51 and a clamping member 53. The rotating member 51 can be rotatably mounted on the second protruding portion 3333. The rotating member 51 can include a connecting portion 511, a first protrusion 513 protruding from one end of the connecting portion 511 and a second protrusion 515 protruding from the other end of the connecting portion 511 and opposite to the first protrusion 513. The first protrusion 512 can be located on one end of the connecting portion 511 close to the second protruding portion 3333. The first protrusion 513 can be rotatably received in one end of the second protruding portion 3333 close to the second fixed portion 3313, and the rotating axis of the first protrusion 513 can be in a vertical direction. The clamping member 53 can include two clamping portions 531 and a socket portion 533 locating on the same ends of the two clamping portions 531. The socket portion 533 can be hollow-shaped and cylinder-shaped. The socket portion 533 can be rotatably sleeved on the second protrusion 515, and the rotating axis of the socket portion 533 can be in a vertical direction. The two clamping portions 531 can be parallel to each other, and further parallel to the first supporting portion 131. The two clamping portions 531 can be both fixed to the socket portion 533. The two clamping portions 531 can be used to clamp the electric screwdriver 400.

When in assembly, the first lifting member 21 can be slidably sleeved on the first supporting portion 131; and the sleeve portion 221 can be slidably sleeved on the second supporting portion 133; the first adjusting assembly 31 can be rotatably sleeved on the sleeve portion 221; the resisting portion 223 can be fixed to the sleeve portion 221; the connecting member 24 can be arranged on the fixed pulley 23, and further couples the first lifting member 21 to the second lifting member 22; the second adjusting assembly 33 can be rotatably mounted on the first adjusting assembly 31; the rotating member 51 can be rotatably mounted on one end of the second adjusting assembly 33 away from the first adjusting assembly 33; the electric screwdriver 400 can be fixed to the clamping member 53; one end of the clamping member 53 away from the electric screwdriver 400 can be rotatably mounted on one end of the rotating member 51 away from the second adjusting assembly 33.

When in use, the screw locking device 100 can be fixed to the worktable 200, the weight of the clump weight 25 can be selected according to the weight of the electric screwdriver 400, and the weight of the clump weight 25 should be greater than the weight of the electric screwdriver 400. The operator can hold the electric screwdriver 400 and further pull the electric screwdriver 400 to a predefined position to tighten or loosen the screws. When the operator releases the electric screwdriver 400, the electric screwdriver 400 will lift a predefined distance as the weight of the clump weight 25 is greater than the weight of the electric screwdriver 400.

In at least one embodiment, the mounting member 11 can be omitted, and the supporting member 13 can be perpendicularly fixed to the worktable 200 directly.

In at least one embodiment, the number of the adjusting assembly can be but not limited two, and further can be selected according to the distance between the product and the supporting member 13. When there is only one adjusting assembly, the fixed assembly can be rotatably fixed to the adjusting assembly perpendicularly. When there are two or more adjusting assemblies, the adjacent adjusting assemblies can be rotatably coupled with each other in sequence.

In at least one embodiment, the rotating member 51 can be omitted, and the clamping member 53 can be rotatably mounted on the second adjusting member 333 of the second adjusting assembly 33.

In at least one embodiment, the mounting way between the first adjusting member 313 and the first fixed portion 3113 can be but not limited to the above embodiment, the first fixed portion 3113 can define a slide groove, and the first adjusting portion 3131 can have a sliding rail corresponding to the slide groove, or the first fixed portion can have a sliding rail, and the first adjusting portion 3131 can have a slide groove corresponding to the sliding rail.

In at least one embodiment, the mounting way between the second adjusting member 333 and the second fixed portion 3313 can be but not limited to the above embodiment, the second fixed portion 3313 can define a slide groove, and the second adjusting portion 3331 can have a sliding rail corresponding to the slide groove, or the second fixed portion 3313 can have a sliding rail, and the second adjusting portion 3331 can define a slide groove corresponding to the slide groove.

In at least one embodiment, the fixed pulley 23 can be fixed to the mounting member 24, and the connecting member 24 can be arranged on the fixed pulley 23, and further slide relative to the fixed pulley 24.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A clamping apparatus comprising:
   a supporting bracket comprising a supporting member;
   a lifting assembly comprising:
      a first lifting member slidably sleeved on the supporting member;
      a second lifting member slidably sleeved on the supporting member;
      a fixed pulley mounted on the supporting member;
      a connecting member arranged on the fixed pulley and coupling the first lifting member to the second lifting member; and
      a clump weight detachably fixed to the first lifting member;
   a first adjusting assembly comprising:
      a first fixed member rotatably sleeved on the second lifting member; and
      a first adjusting member slidably mounted on the first fixed member; and
   a holding assembly rotatably mounted on the first adjusting member.

2. The clamping apparatus of claim 1, wherein the clamping apparatus further comprises a second adjusting assembly, the second adjusting assembly comprises a second fixed member and a second adjusting member slidably mounted on the second fixed member, the second fixed member is rotatably mounted on the first adjusting member, and the holding assembly is rotatably mounted on the second adjusting member.

3. The clamping apparatus of claim 2, wherein the holding assembly comprises a rotating member and a clamping member, the rotating member is rotatably mounted on the second adjusting member, and the clamping member is rotatably mounted on the rotating member.

4. The clamping apparatus of claim 3, wherein the clamping member comprises two clamping portions and a socket portion fixed to the two clamping portions, the socket portion is rotatably mounted on the rotating member, the two clamping portions are parallel with each other, and the two clamping portions are fixed to the socket portion.

5. The clamping apparatus of claim 3, wherein rotating axis of the first fixed member, the second fixed member, the rotating member and the clamping member are both in a vertical direction.

6. The clamping apparatus of claim 2, wherein the second fixed member defines a plurality of second adjust holes, the second adjusting member defines a second slide groove, the second adjusting assembly further comprises a plurality of second fasters, the plurality of second fasters partially pass through the second slide groove and further engage with the plurality of second adjust holes of the second fixed member and partially resist the first adjusting member.

7. The clamping apparatus of claim 1, wherein the first fixed member defines a plurality of first adjust holes, the first adjusting member define a first slide groove, the first adjusting assembly further comprises a plurality of first fasters, the plurality of first fasters partially pass through the first slide groove and further engage with the plurality of first adjust holes of the first adjusting member and partially resist the first adjusting member.

8. The clamping apparatus of claim 1, wherein the supporting member comprises a first supporting portion, a second supporting portion and a mounting portion, the mounting portion is fixed between the first supporting portion and the second supporting portion, the first lifting member is slidably sleeved on the first supporting portion, the second lifting member is slidably sleeved on the second supporting portion, and the fixed pulley is rotatably mounted on the mounting portion.

9. The clamping apparatus of claim 8, wherein the second lifting member comprises a sleeve portion and a resisting portion, the sleeve portion is slidably sleeved on the second supporting portion, the first fixed portion is rotatably sleeved on the sleeve portion, and further resist the sleeve portion, and the resisting member is fixed to the sleeve portion and further resist the first fixed portion.

10. A screw locking device, comprising:
a clamping apparatus;
an electric screw driver fixed on the clamping apparatus;
wherein the clamping apparatus comprises:
 a supporting bracket comprising a supporting member;
 a lifting assembly comprising:
  a first lifting member slidably sleeved on the supporting member;
  a second lifting member slidably sleeved on the supporting member;
  a fixed pulley mounted on the supporting member;
  a connecting member arranged on the fixed pulley and coupling the first lifting member to the second lifting member; and
  a clump weight detachably fixed to the first lifting member;
 a first adjusting assembly comprising:
  a first fixed member rotatably sleeved on the second lifting member; and
  a first adjusting member slidably mounted on the first fixed member; and
 a holding assembly rotatably mounted on the first adjusting member;
wherein the electric screw driver is fixed on the holding assembly.

11. The screw locking device of claim 10, wherein the clamping apparatus further comprises a second adjusting assembly, the second adjusting assembly comprises a second fixed member and a second adjusting member slidably mounted on the second fixed member, the second fixed member is rotatably mounted on the first adjusting member, and the holding assembly is rotatably mounted on the second adjusting member.

12. The screw locking device of claim 11, wherein the holding assembly comprises a rotating member and a clamping member, the rotating member is rotatably mounted on the second adjusting member, and the clamping member is rotatably mounted on the rotating member.

13. The screw locking device of claim 12, wherein the clamping member comprises two clamping portions and a socket portion fixed to the two clamping portions, the socket portion is rotatably mounted on the rotating member, the two clamping portions are parallel with each other, and the two clamping portions are fixed to the socket portion.

14. The screw locking device of claim 12, wherein a rotating axis of the first fixed member, the second fixed member, the rotating member and the clamping member are both in a vertical direction.

15. The screw locking device of claim 11, wherein the second fixed member defines a plurality of second adjust holes, the second adjusting member defines a second slide groove, the second adjusting assembly further comprises a plurality of second fasters, the plurality of second fasters partially pass through the second slide groove and further engage with the plurality of second adjust holes of the second fixed member and partially resist the first adjusting member.

16. The screw locking device of claim 10, wherein the first fixed member defines a plurality of first adjust holes, the first adjusting member define a first slide groove, the first adjusting assembly further comprises a plurality of first fasters, the plurality of first fasters partially pass through the first slide groove and further engage with the plurality of first adjust holes of the first adjusting member and partially resist the first adjusting member.

17. The screw locking device of claim 10, wherein the supporting member comprises a first supporting portion, a second supporting portion and a mounting portion, the mounting portion is fixed between the first supporting portion and the second supporting portion, the first lifting member is slidably sleeved on the first supporting portion, the second lifting member is slidably sleeved on the second supporting portion, and the fixed pulley is rotatably mounted on the mounting portion.

18. The screw locking device of claim 17, wherein the second lifting member comprises a sleeve portion and a resisting portion, the sleeve portion is slidably sleeved on the second supporting portion, the first fixed portion is rotatably sleeved on the sleeve portion, and further resist the sleeve portion, and the resisting member is fixed to the sleeve portion and further resist the first fixed portion.

* * * * *